United States Patent [19]

Watanabe et al.

[11] Patent Number: 4,894,555
[45] Date of Patent: Jan. 16, 1990

[54] BRAKE CONTROL SYSTEM AND METHOD FOR A VEHICLE

[75] Inventors: Namio Watanabe; Kinji Ogino; Satomi Ookubo, all of Saitama, Japan

[73] Assignee: Akebono Brake Industry Co., Ltd., Tokyo, Japan

[21] Appl. No.: 122,999

[22] Filed: Nov. 19, 1987

[30] Foreign Application Priority Data

Nov. 21, 1986 [JP] Japan .................... 61-276450
Dec. 16, 1986 [JP] Japan .................... 61-297798

[51] Int. Cl.$^4$ .................................. B60T 8/32
[52] U.S. Cl. .................................. 303/113; 303/115; 303/116; 303/119
[58] Field of Search ............... 303/113, 115, 100, 105, 303/106; 180/197

[56] References Cited

U.S. PATENT DOCUMENTS

| | | | |
|---|---|---|---|
| 4,156,547 | 5/1979 | Marsh | 303/106 V |
| 4,589,511 | 5/1986 | Leiber | 303/110 |
| 4,629,039 | 12/1986 | Imoto et al. | 188/106 P |
| 4,648,663 | 3/1987 | Nomura et al. | 303/106 |
| 4,714,296 | 12/1987 | Imoto et al. | 303/110 |
| 4,729,221 | 3/1988 | Nomura et al. | 60/416 |
| 4,753,490 | 6/1988 | Belart et al. | 303/92 |
| 4,755,008 | 7/1988 | Imoto et al. | 303/114 |

FOREIGN PATENT DOCUMENTS 2180606 4/1987 United Kingdom .
2180901 4/1987 United Kingdom .

Primary Examiner—Andres Kashnikow
Assistant Examiner—Matthew C. Graham
Attorney, Agent, or Firm—Cushman, Darby & Cushman

[57] ABSTRACT

The brake control system for use in a vehicle includes a compression cylinder device and a decompression cylinder device, which communicate with a fluid passage between a gate valve and a wheel cylinder. A compression piston is reciprocately disposed inside of the compression cylinder device and a decompression piston is reciprocately disposed inside of the decompression cylinder device. A close valve of a normally close type is provided between the fluid passage and the decompression cylinder device. The system further includes a valve system provided between an accumulator and the compression and decompression cylinder devices. The valve system is provided for selectively supplying the hydraulic pressure in the accumulator to the compression and the decompression cylinder devices during skid-preventing and acceleration slip-preventing controls.

5 Claims, 3 Drawing Sheets

BRAKE CONTROL SYSTEM AND METHOD FOR A VEHICLE

FIELD OF THE INVENTION

The present invention relates to a brake control system for use in a motor vehicle. More particularly, the invention relates to a system, with a simple device, for effectively preventing driving wheels from slipping when the vehicle accelerates, and for effectively preventing the driving and the driven wheels from skidding when the vehicle decelerates.

BACKGROUND OF THE INVENTION

Conventional system for preventing a wheel of a motor vehicle from skidding have been known, for example, a system which controls a hydraulic pressure applied to a wheel cylinder of a brake device in accordance with a rotation status of the wheel relative to a threshold value when the vehicle decelerates.

Further, there has been a conventional system for preventing a driving wheel of the vehicle from slipping by controlling a brake force caused by a hydraulic pressure in a wheel cylinder of a brake device of the driving wheel in accordance with a slipping status relative to a threshold value when the vehicle starts to move and accelerates.

These conventional systems, however, require an extra space and extra equipment which raises the cost.

Further, in the system for preventing the vehicle from skidding in which the hydraulic pressure applied to the wheel cylinder of the brake system is controlled, the brake force should preferably be controlled as large as possible within a range in which the wheel does not lock in order to decrease a large force of inertia of the moving vehicle as rapid as possible. On the other hand, in the system for preventing the driving wheel from slipping in which the hydraulic pressure applied to the driving wheel is controlled so that a torque suitably corresponds to an adhesion between the road and tires of the vehicle, the brake force should be varied calmly. That is, since the torque of the driving wheel is smaller than that of the brake, if a large brake force is actuated during an acceleration slip-preventing control of the driving wheel, the driving torque may be excessively decreased and the motor vehicle would not accelerate effectively.

In the conventional acceleration slip-preventing control of the driving wheel, the brake force may be excessively actuated since the brake force is not appropriately controlled.

SUMMARY OF THE INVENTION

The present invention is made to eliminate the above-described problems of the conventional system.

Therefore, an object of the invention is to provide a brake control system for use in a vehicle, having common equipments for the slip-preventing and skid-preventing controls by which any extra equipment is no longer required.

Another object of the invention is to provide a brake control system by which an acceleration slip of the driving wheel can be so controlled that a driving torque is not excessively decreased during the slip-preventing control, and that the vehicle wheel does not lock during the skid-preventing control.

In order to obtain a primary object described above, a system of the presention is constructed as follows.

The system of the invention includes a master cylinder generating a hydraulic pressure for a brake, a fluid passage communicating the master cylinder with the wheel cylinder of the brake device, and a gate valve of a normally open type provided at the fluid passage. The gate valve closes during the skid-preventing control and the acceleration slip-preventing control of the driving wheel. The system of the invention further includes a compression cylinder device and a decompression cylinder device, which communicate with the fluid passage between the gate valve and the wheel cylinder. A compression piston is reciprocately disposed inside of the compression cylinder device. The compression piston divides the inside of the compression cylinder device into a fluid supply chamber and a rear chamber. A decompression piston is reciprocately disposed inside of the decompression cylinder device. The decompression piston divides the inside of the decompression cylinder device into a decompression chamber and a back chamber. The fluid supply chamber communicates with the fluid passage. A close valve of a normally close type is provided between the fluid passage and the decompression chamber of the decompression cylinder device. The close valve opens in accordance with a wheel lock signal. The system further includes an accumulator accumulating a hydraulic pressure when the motor vehicle moves, and a valve system provided between the accumulator and the rear and back chambers of the compression and decompression cylinder devices, respectively. The valve system is provided for selectively supplying the hydraulic pressure in the accumulator to the rear and back chambers during skid-preventing and acceleration slip-preventing controls.

In a normal brake operation by a brake pedal, the gate valve opens, the close valve closes and a cut valve opens to thereby exhaust the hydraulic pressure of the rear chamber of the compression cylinder into a reservoir in association with a decay valve and a build valve controlled by a control unit. Then the decompression and the compression cylinder devices are not operated. Therefore, the hydraulic pressure generated by the master cylinder is directly supplied to the wheel cylinder so that the brake force is actuated.

In the skid-preventing control and the slip-preventing control, the gate valve closes to thereby suspend the brake operation by the brake pedal. The control unit controls the build valve and the decay valve to open or close according to a deceleration threshold value or an acceleration slipping threshold value which corresponds to a driving status of the motor vehicle, so as to control the hydraulic pressure applied from the accumulator to the rear chamber of the compression cylinder device and the back chamber of the decompression cylinder device.

That is, in the skid-preventing control, the compression piston does not move although the hydraulic pressure in the fluid passage is actuated to the fluid supply chamber of the compression cylinder device, while the decompression piston is moved by the hydraulic pressure applied to the decompression chamber since the close valve opens. Accordingly, the brake fluid in the wheel cylinder is flowed in the decompression chamber to thereby decrease the hydraulic pressure to a value by which the wheel does not lock.

In the slip-preventing control, the decompression piston is kept abutting against an inner wall at the decompression chamber side of the decompression cylinder device, since the close valve closes while the compression piston is urged to move toward the fluid supply chamber side of the compression cylinder device so that the hydraulic pressure in proportion with that in the accumulator is supplied to the wheel cylinder of the brake device of the driving wheel. Accordingly the motor vehicle can start moving by an appropriate driving force with a minimum slipping of the driving wheel.

The control unit controls the close valve, the build valve and the decay valve to open or close, during the skid-preventing control so that the brake force can rapidly be increased and decreased. On the other hand, in the slip-preventing control, the control unit varies the fluid pressure of the accumulator actuated to the rear chamber of the compression cylinder device to threreby delicately control the brake force, so that the motor vehicle can start moving with its highest driving force while the slip of the driving wheel minimizes.

The build valve and the decay valve can be commonly utilized both in the above-described controls. Therefore, the brake control system does not require any extra equipment.

In order to obtain the above-described second object, another embodiment of the present invention is constructed as follows.

The brake force is controlled by increasing and decreasing the hydraulic pressure applied to the wheel cylinder of the brake device of the vehicle wheel so that a rising rate of the hydraulic pressure during the skid-preventing control of the vehicle wheel is larger than that during an acceleration slip-preventing control of the driving wheel. This operation is obtained by that a diameter of the decompression piston is larger than that of the compression piston.

The vehicle can rapidly decrease its speed to a preferable speed without locking the wheel, because of the large rising rate of the hydraulic pressure applied to the wheel cylinder of the brake device. On the other hand, in the acceleration slip-preventing control of the driving wheel, the vehicle can effectively start moving with its preferable torque without slipping the driving wheel since the rising rate of the hydraulic pressure is smaller than that during the skid-preventing control.

PREFERRED EMBODIMENT OF THE INVENTION

Figure 1:
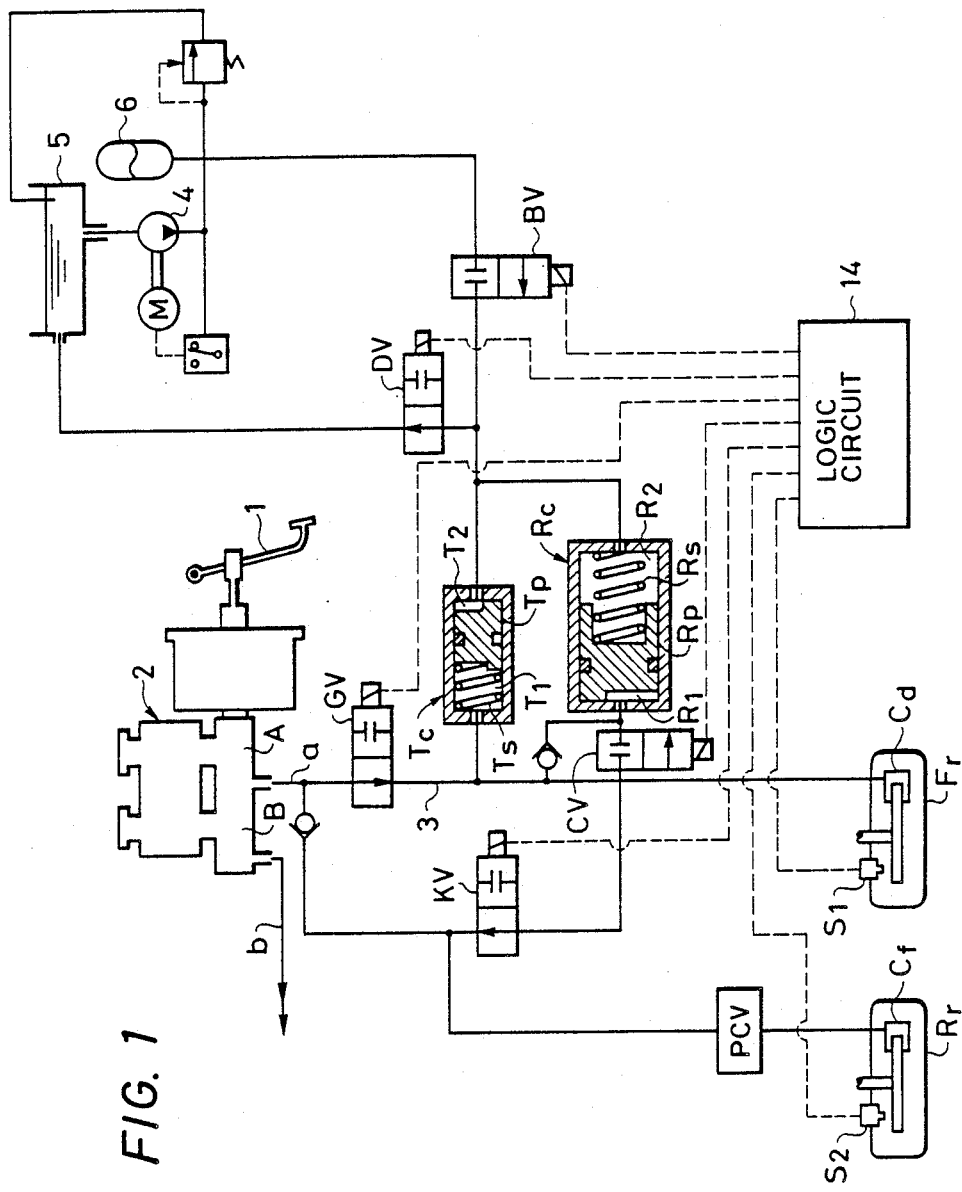
FIG. 1 is a circuit diagram showing a brake control system according to an embodiment of the pesent invention.
Figure 2:
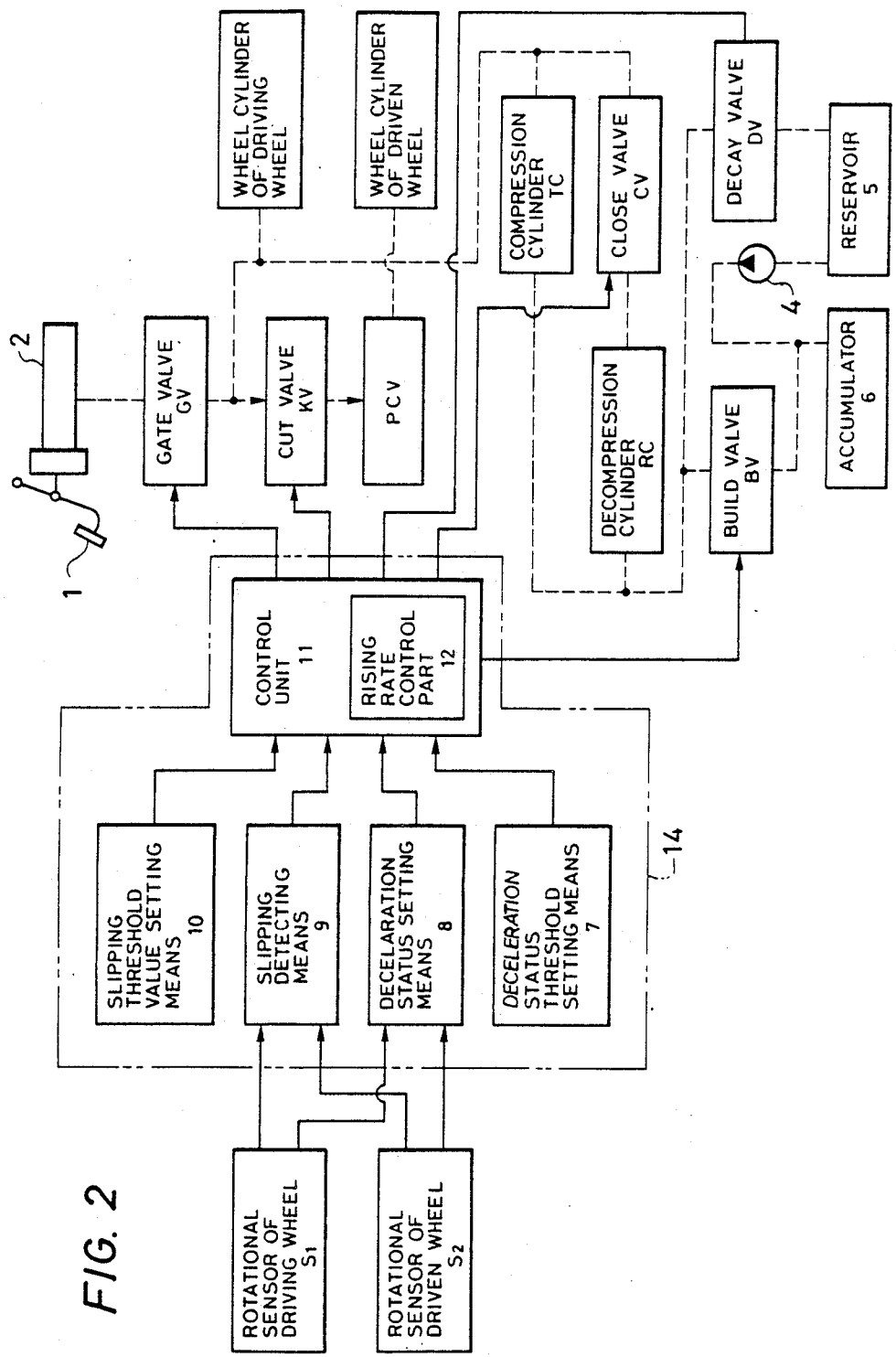
FIG. 2 shows a block diagram of the hydaulic control system of FIG. 1.

An embodiment of the present invention will be described with reference to accompanying drawings. FIG. 1 shows a hydraulic circuit and FIG. 2 shows a block diagram for controlling the hydraulic circuit.

A master cylinder 2 generates a hydraulic pressure proportioned to a force applied by a brake pedal 1. The master cylinder 2 comprises a fluid chambers A and B. The hydraulic pressure in the fluid chamber A is supplied, through a fluid passage a and a gate valve GV of a normally open type, to an A brake system including, for example, a driving wheel Fr at a front-and-left and a driven wheel Rr at a rear-and-right of the vehicle. Similarly, a hydraulic pressure in the fluid chamber B is supplied, through a fluid passage b and another gate valve (not shown in FIG. 1), to a B brake system including a driving wheel at front-and-right and a driven wheel at a rear-and-left of the vehicle (both not shown in the figure).

A specific flow control will be described below with respect merely to the A brake system.

A hydraulic pressure passed through the gate valve GV is supplied, through a fluid passage 3 to a wheel cylinder Cd of a brake device of the driving wheel Fr at the front-and-left of the vehicle. Simultaneously, the hydraulic pressure is supplied to a wheel cylinder Cf of a brake device of the driven wheel Rr at the rear-and-right of the vehicle through a cut valve KV of a normally open type and a proportioning valve PCV of a publicly known type. The fluid passage 3 communicates with a decompression chamber R1 in the decompression cylinder device RC through a close valve CV of a normally close type. The fluid passage 3 also communicates with a fluid supplying chamber T1 in a compression cylinder device TC.

A decompression piston RP of the decompression cylinder device Rc is always urged toward the decompression chamber R1 side by a second spring RS disposed inside of a back chamber R2 of the decompression cylinder device RC. A compression piston TP is always urged toward a rear chamber T2 of the compression cylinder device TC by a first spring TS disposed inside of the fluid supplying chamber T1 of the compression cylinder device TC.

While the vehicle is moving, a pump 4 actuated by a motor M supplies a brake fluid from a reservoir 5 to an accumulator 6 under a constant pressure. The hydraulic pressure in the accumulator 6 is supplied to the back chamber R2 of the decompression cylinder device RC and to the rear chamber T2 of the compression cylinder device TC when a decay valve DV of a normally open type closes and a build valve BV of a normally close type opens. Both the back chambers R2 and rear chamber T2 communicate with the reservoir 5 through the decay valve DV of a normally open type.

The gate valve GV, the cut valve KV, the close valve CV, a valve system V including the build valve BV and the decay valve DV are, during a normal brake control according to an actuation of a brake pedal 1, during the skid-preventing operation of the vehicle, and during the slip-preventing operation when the vehicle starts moving and accelerates, controlled as follows.

FIG. 2 is a block diagram showing an example of a hydraulic control system according to the present invention.

Rotating sensors S1 and S2 detect rotational speeds of the driving wheel Fr and the driven wheel Rr, respectively. A deceleration status threshold value setting means 7 predetermines, in view of a condition of the motor vehicle, a deceleration ratio of the wheel, which is in a critical condition wherein the wheels do not lock, as a deceleration status threshold value, for example. A deceleration status detecting means 8 calculates an actual deceleration ratio during the deceleration condition of the vehicle in accordance with ratios of changes in the rotational speed of the wheels detected by the rotational sensors S1 and S2.

A slipping ratio of the driving wheel Fr, during the vehicle acceleration when it is starting to move, is detected by a slipping detecting means 9 based on the output of the rotating sencor S1 of the driven wheel Rr. A slipping ratio where the largest adhesion between the tires of the motor vehicle and the road is attained is predetermined by a slipping threshold value setting means 10.

The above described means, that is the deceleration status setting means 8, the slipping detecting mans 9, the deceleration status threshold setting means 7 and the slipping threshold value setting means 10 consist of a microcomputer, for example. A control unit 11 consisting of a mictrocomputer, for example, controls the cut valve KV, the gate valve GV, the close valve CV, the decay valve DV and the build valve BV during the skid-preventing and the slip-preventing opertions of the motor vehicle, to thereby obtain a constant relationship between the threshold values an the deceleration ratio and the slipping ratio.

In the normal brake operation by the brake pedal 1, the control unit 11 closes the gate valve GV, the close valve CV, the cut valve KV, the build valve BV and the decay valve DV, as shown in FIG. 1. Therefore, the hydraulic pressure for the brake generated by the master cylinder 2 is supplied to the wheel cylinder Cd of the brake device of the driving wheel Fr, and it is also supplied to that of the driven wheel Rr after decompressed by the proportioning valve PCV.

Under this condition, the decompression piston RP sbuts against the inner wall of the decompression chamber R1 side of the decompression cylinder device RC by an elastic force of the second spring RS, since the close valve CV disposed at the upper side of the decompression cylinder device RC closes. On the other hand, the compression piston TP sbuts against the inner wall of the rear chamber T2 side of the compression cylinder device TC by the first spring TS and also by the hydraulic pressure for the brake.

The fluid pressure compressed by the pump 4 is accumulated in the accumulator 6. In the normal brake operation, both the above pistons RP and TP are not actuated by the fluid pressure in the accumulator 6 since the control unit 11 closes the build valve BV.

Figure 3:
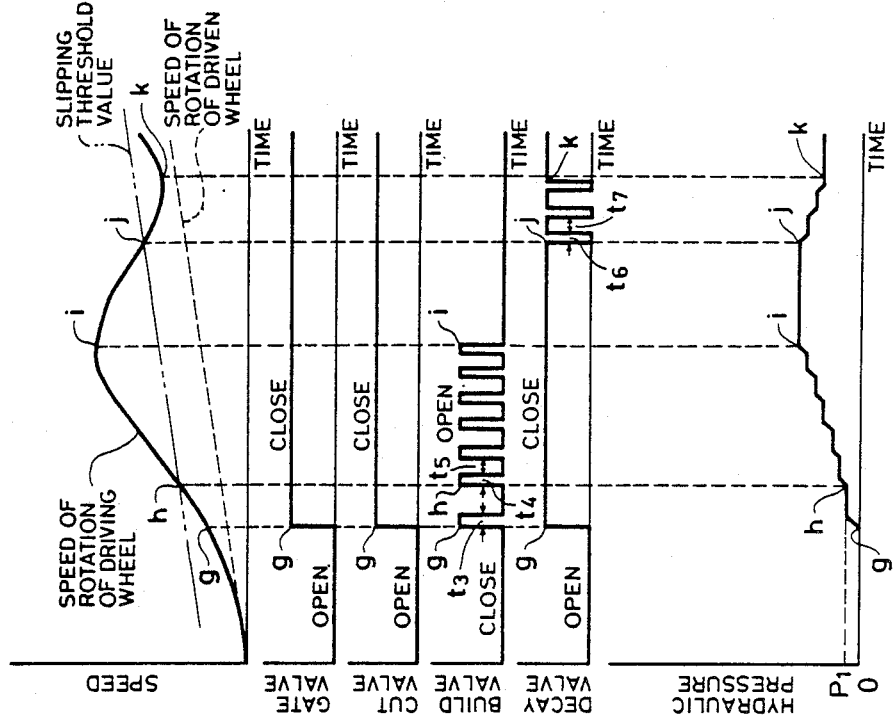
FIG. 3 is a timing chart of a control characteristic during a skid-preventing control.

During the normal brake operation by the brake pedal 1, if the vehicle wheel begins to lock, the skid-preventing control is operated. FIG. 3 shows a control characteristic of the skid-preventing control.

If the rotational speed of the wheel comes to be lower than the deceleration status threshold value at a point d in FIG. 3, the control unit 11 closes the gate valve GV based on a wheel lock detection signal and, accordingly, the hydraulic pressure is confined in the fluid passage 3 and in the wheel cylinders Cd and Cf. At the same time, the control unit 11 opens the close valve CV so that the hydraulic pressure for the brake urges the decompression piston RP toward the back chamber R2 side against the elastic force of the second spring RS to thereby increase a volume of the decompression chamber R1. Then, the hydraulic pressure in the fluid passage 3 decreases and, accordingly, the brake force decreases. After that if the rotational speed of the wheel recovers, that is, the rotational speed of the wheel reaches the deceleration status threshold value at a point e in FIG. 3, the control unit 11 closes the decay valve DV to thereby maintain the hydraulic pressure for the brake constant. Therefore, the brake force maintains constant.

Then, if the rotational speed of the wheel reaches to a peak point f in FIG. 3, for example, the build valve BV alternately opens and closes for little time periods t1 and t2, respectively. By this open-and-close operation of the build valve BV, the hydraulic pressure in the accumulator 6 is supplied step by step to both the back chambers R2 and the rear chamber T2 of the decompression cylinder device RC and the compression cylinder device TC, respectively. An amount of each of the little time periods t1 and t2 is predetermined by a rising control part 12 provided in the control unit 11.

When the decompression piston RP is urged to move toward the decompression chamber R1 side (left side in FIG. 1) by the hydraulic pressure from the accumulator 6 so that the brake force applied to the wheel cylinders Cd and Cf increases, the compression piston TP does not move although the hydraulic pressure from the accumulator 6 is applied to the piston TP. If the decompression piston RP comes into abutment against the left end wall of the decompression chamber R1, the brake force applied to the wheel cylinders Cd and Cf stop increasing. After that, if the hydraulic pressure applied o the rear chamber T2 from the accumulator 6 extends a predetermined value, the compression piston TP is moved toward the fluid supply chamber T1 side (right side in FIG. 1) so that the brake force applied to the wheel cylinders Cd and Cf further increases. In order to obtain this operation, for example, a diameter of the decompression piston is made larger than that of the compression piston.

The above-described operation of the compression cylinder device TC and the decompression cylinder device RC is obtained when the following equations are satisfied.

(1) A balance equation in the pressure increasing step by the decompression piston RP:

$$A1 \cdot Pw + Q1 = Po + F1 \text{ (where } F1 > Q1)$$

$$\therefore Po = Pw - (F1 - Q1)/A1$$

(2) A balance equation in the pressure increasing step by the compression piston TP:

$$A2 \cdot Pw + Q2 + F2 = A2 \cdot Po'$$

$$\therefore Po' = Pw + (F2 + Q2)/A2$$

where A1 represents a sectional area of decompression piston RP, Po a pressure in back chamber R2, F1 a load of decompression spring Rs, Q1 a reciprocating friction resistance of decompression piston RP, A2 a sectional area of compression piston TP, Po' a pressure in rear chamber T2, F2 a load of compression spring Ts, Q2 a reciprocating friction resistance of compression piston TP, and Pw a pressure of brake side.

That is, a necessary increasing amount $\Delta P$ for starting to move the compression piston TP after the decompression piston RP abutted against the wall of the cylinder Rc is determined by an equation below:

$$\Delta P = Po' - Po = P1 + (F2 + Q2)/A2 - \{P1 - (F1 - Q1)/A1\}$$
$$= (F2 + Q2)/A2 + (F1 - Q1)/A1$$

While the vehicle moves, in case that a cofficient of friction of the road changes from being low to high, the brake force applied to the wheel cylinders can further increase since the compression piston TP moves leftwardly even after the abutment of the decompression piston RP against the left side wall of the chamber R1. Therefore, the effective brake force can be applied to the wheel cylinders according to the condition of the road and, as a result, a brake distance can be reduced.

The amount ΔP is preferably determined as small as possible.

The decompression piston RP moves toward the decompression chamber R1 side step by step since the build valve BV repeats the open and close operation. Accordingly, the brake force applied to the wheel cylinders Cd and Cf increases step by step as shown in FIG. 3.

As described above, the hydraulic pressure is appropriately decompressed, maintained the same, and compressed so that the speed of the motor vehicle is effectively decreased to a predetermined value without locking of the vehicle wheels.

Figure 4:
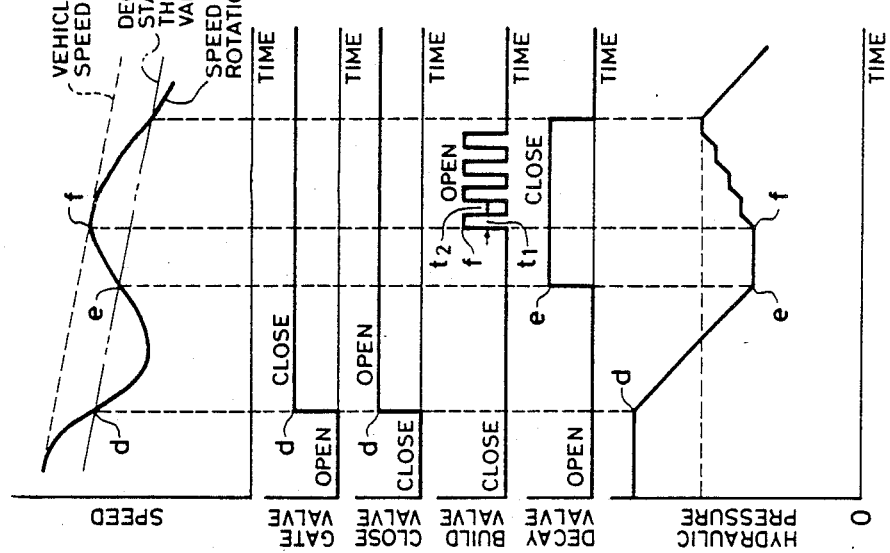
FIG. 4 is a timing chart of a control characteristic during a slip-preventing control.

FIG. 4 shows a control characteristic of an acceleration slip control of the driving wheel for preventing the driving wheel from slipping when the motor vehicle starts to move and accelerates. When a difference in speed of rotation between the driving wheel Fr and the driven wheel Rr exceeds a predetermined value at a point g in FIG. 4, and the driving wheel Fr starts to slip, the control unit 11 closes that cut valve KV, the decay valve DV and the gate valve GV, and opens the build valve BV for a little time period t3. During the time period t3, the compression piston TP is urged to move toward the fluid supply chamber T1 side by the hydraulic pressure applied from the accumulator 6 to the rear chamber T2. Accordingly, the hydraulic pressure in the fluid passage 3 is preliminarily increased to a value P1. In this condition, the brake device of the driving wheel Fr is maintained in an initial braking condition, that is, in a brake dragging condition. After that, the control unit 11 increases the hydraulic pressure in the fluid passage 3 so that the exce- ssive driving force to the driving wheel is effectively suppressed.

The acceleration slip condition progresses and when the speed of rotation of the driving wheel reaches the slip threshold value at a point h in FIG. 4, the control unit 11 outputs an acceleration detection signal to thereby open the build valve BV for a little time period t4 and successively close it for a time period t5. While this open-and-close operation of the build valve BV continues, the hydraulic pressure is supplied to the rear chamber T2 step by step from the accumulator 6 so that the compression piston TP moves toward the fluid supply chamber T1 side step by step. Therefore, the hydraulic pressure in the fluid passage 3 and the wheel cylinder Cd of the brake device of the driving wheel Fr increases step by step as shown in FIG. 4, so that the brake force increases and accordingly the acceleration slip of the driving wheel decreases. The time period t4 where the build valve BV opens is preset less than the time period t1 for which the build valve BV opens in the above-described skid-preventing control. Therefore, a rising rate of the hydraulic pressure is small suitably for the acceleration slip control of the driving wheel.

When the speed of rotation of the driving wheel reaches a high peak point i in FIG. 4, the build valve BV is maintained closing and the hydraulic pressure to the brake device is held being the same. The speed of rotation of the driving wheel decelerates due to the brake force actuated to the wheel cylinder Cd. When the speed of the driving wheel comes to be identical with the slipping theshold value at a point j in FIG. 4, the control unit 11 opens the decay valve DV for a little time period t6 and closes it for a time period t7. This open-and-close operation of the decay valve DV continues for a while so that the hydraulic pressure in the rear chamber T2 exhausts into the reservoir 5 and, accordingly, the compression piston TP moves step by step toward the rear chamber T2 side. As a result, the hydraulic pressure applied to the wheel cylinder Cd decreases step by step as shown in FIG. 4. When the speed of rotation of the driving wheel reaches a low peak point k, the open-and-close operation of the decay valve DV stops. The speed of the motor vehicle increases while rapidly suppressing the acceleration slip of the driving wheel, since the hydraulic pressure applied to the wheel cylinder is compressed, held being the same and decompressed as described above.

As mentioned above, the rising rate mya be so controlled that a sum of the open time period and the close time period of the build valve BV is maintained constant, that is, the following equation is satisfied:

$$t1+t2=t4+t5 \; (t1>t4, \; t2<t5)$$

In this condition, a duty rate of electrical pulses to the build valve BV is controlled so as to have a short pulse during the control of the acceleration slipping of the driving wheel. Alternately, the rising rate control part 12 of the control unit 11 is so constructed that both the open time period t1 and the close time period t2 of the build valve during the acceleration slip control of the driving wheel are shorter than that during the skid-preventing control of the wheel.

In the above embodiment, the logic circuit 14 comprising the control unit 11 is constructed as shown in FIG. 2. However, the logic circuit is not limited thereto or thereby. That is, the circuit may be another known circuit.

The brake control device of the present invention thus constructed can effectively control the brake operation, in the skid-prevention control, in which the brake force is appropriately controlled and, as a result, the wheel of the motor vehicle does not lock.

In the slip-prevention control, the compression piston TP is operated by the hydraulic pressure controlled by the build valve BV and the decay valve DV which open and close in accordance with the driving status of the driving wheel Fr relative to the predetermined slipping threshold value. Therefore, the appropriate hydraulic pressure for controlling the driving force is generated by the compression piston TP, so that the driving force corresponding to the adhesion between the tires of the motor vehicle and the road can be obtained and then the vehicle can accelerate with a minimum slipping.

As described above, since the valve system V including the build valve BV and the decay valve DV is commonly utilized in the slip-preventing control when the driving wheel accelerates and in the skid-preventing control of the wheel when the wheel decelerates, the brake system requires small number of parts and can be controlled by a common control system. Therefore, the brake system of the present invention is advantageous in that the system is low in manufacturing cost and simple in the control system.

Further, according to the present invention, a rising rate of the hydraulic pressure for the brake applied to the wheel cylinder of the brake device is set to he high in the skid-preventing control and low in the slip-preventing control. Therefore, in the skid-preventing control, the speed of the vehicle can rapidly decelerate by changing the brake force within a range where the vehicle wheel does not lock. On the other hand, in the slip-preventing control when the driving wheel accelerates, the brake force can be calmly decreased so that an effective acceleration when the vehicle starts to move can be obtained without excessively decreasing the torque of the driving wheel.

What is claimed is:

1. A brake control system for use in a motor vehicle, comprising:
    a master cylinder generating a fluid pressure for a brake;
    a brake device having a wheel cylinder;
    a fluid passage communicating said master cylinder with said wheel cylinder;
    a gate valve of a normally open type provided at said fluid passage, said gate valve closing during the skid-preventing control of a wheel and the acceleration slip-preventing control of a driving wheel;
    a compression cylinder device provided at said fluid passage between said gate valve and said wheel cylinder, said compression cylinder device having a compression piston reciprocately disposed therein, said compression piston dividing an inside of said compression cylinder device into a fluid supply chamber communicating with said fluid passage and a rear chamber;
    a decompression cylinder device provided at said fluid passage between said gate valve and said wheel cylinder, said decompression cylinder device having a decompression piston disposed therein, said decompression piston dividing an inside of said decompression cylinder device into a decompression chamber and a back chamber;
    a close valve of a normally close type provided between said decompression chamber and said fluid passage, said close valve being opened by a wheel lock signal;
    an accumulator accumulating a hydraulic pressure; and a valve system provided between said accumulator and said rear and back chambers of said compression and decompression cylinder devices, said valve system selectively supplying the hydraulic pressure in said accumulator to said rear and back chambers during the skid-preventing control of the vehicle wheel and the acceleration slip-preventing control of the driving wheel.

2. The brake control system of claim 1, wherein said compression piston of said compression cylinder device is urged by a first spring toward said rear chamber side, and said decompression piston of said decompression cylinder device is urged by a second spring toward said decompression chamber side.

3. The brake control system of claim 1, further comprising a cut valve provided at said fluid passage between said master cylinder and a wheel cylinder of the brake device of a driven wheel, said cut valve being of a normally open type and closing during the slip-preventing control when the motor vehicle starts to move.

4. The brake control system of claim 1, wherein said valve system includes a first valve of a normally close type opening to thereby communicate said accummulator with said rear and back chambers, and a second valve of a normally open type normally communicating said rear and back chambers with a reservoir.

5. The brake control system of claim 1, wherein a diameter of said decompression piston is larger than that of said compression piston.

* * * * *

UNITED STATES PATENT AND TRADEMARK OFFICE
CERTIFICATE OF CORRECTION

PATENT NO. : 4,894,555

DATED : Jan. 16, 1990

INVENTOR(S) : Namio Watanabe

It is certified that error appears in the above-identified patent and that said Letters Patent is hereby corrected as shown below:

Title page:

Add a second assignee as follows:
Akebono Research and Development Centre Ltd. Saitama, Japan---

Signed and Sealed this

Twenty-third Day of April, 1991

Attest:

HARRY F. MANBECK, JR.

*Attesting Officer*

*Commissioner of Patents and Trademarks*